Oct. 25, 1949.    R. J. NADHERNY    2,486,317
MATERIAL HANDLING AND LOADING APPARATUS
Filed June 10, 1946    10 Sheets-Sheet 1

Inventor
Russell J. Nadherny
By Albert G. McCaleb
Atty.

Oct. 25, 1949. R. J. NADHERNY 2,486,317
MATERIAL HANDLING AND LOADING APPARATUS
Filed June 10, 1946 10 Sheets-Sheet 2

Inventor.
Russell J. Nadherny
By: Albert G. McCaleb
Atty

Oct. 25, 1949.　　　R. J. NADHERNY　　　2,486,317
MATERIAL HANDLING AND LOADING APPARATUS
Filed June 10, 1946　　　　　　　　　　　　　　10 Sheets-Sheet 3

Inventor:
Russell J. Nadherny
By Albert G. McCaleb
Atty

Oct. 25, 1949.   R. J. NADHERNY   2,486,317
MATERIAL HANDLING AND LOADING APPARATUS
Filed June 10, 1946   10 Sheets-Sheet 6

Inventor
Russell J. Nadherny
By Albert C. McCabe
Atty.

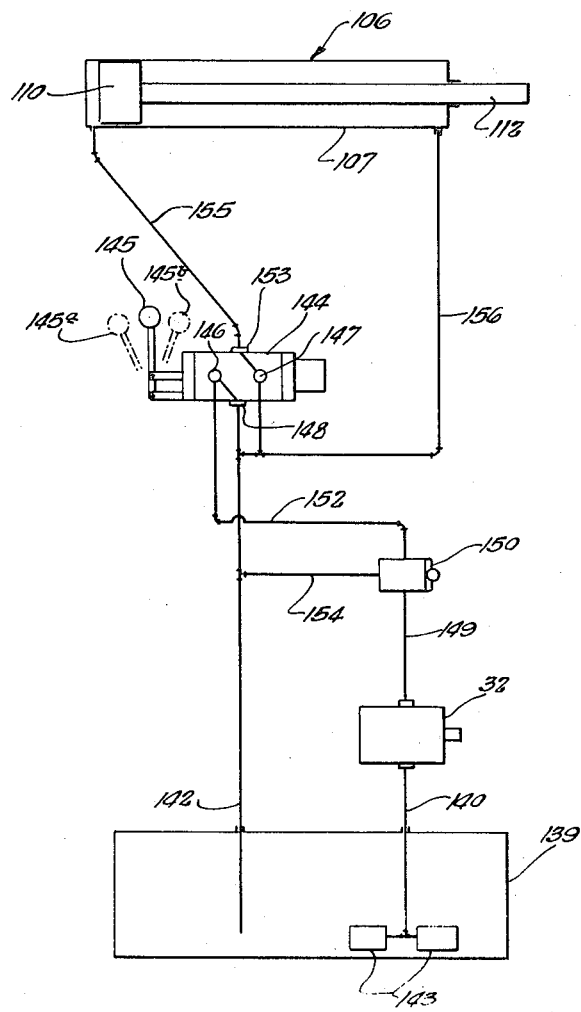

Oct. 25, 1949.　　　　R. J. NADHERNY　　　　2,486,317
MATERIAL HANDLING AND LOADING APPARATUS
Filed June 10, 1946　　　　　　　　　　　　10 Sheets-Sheet 9
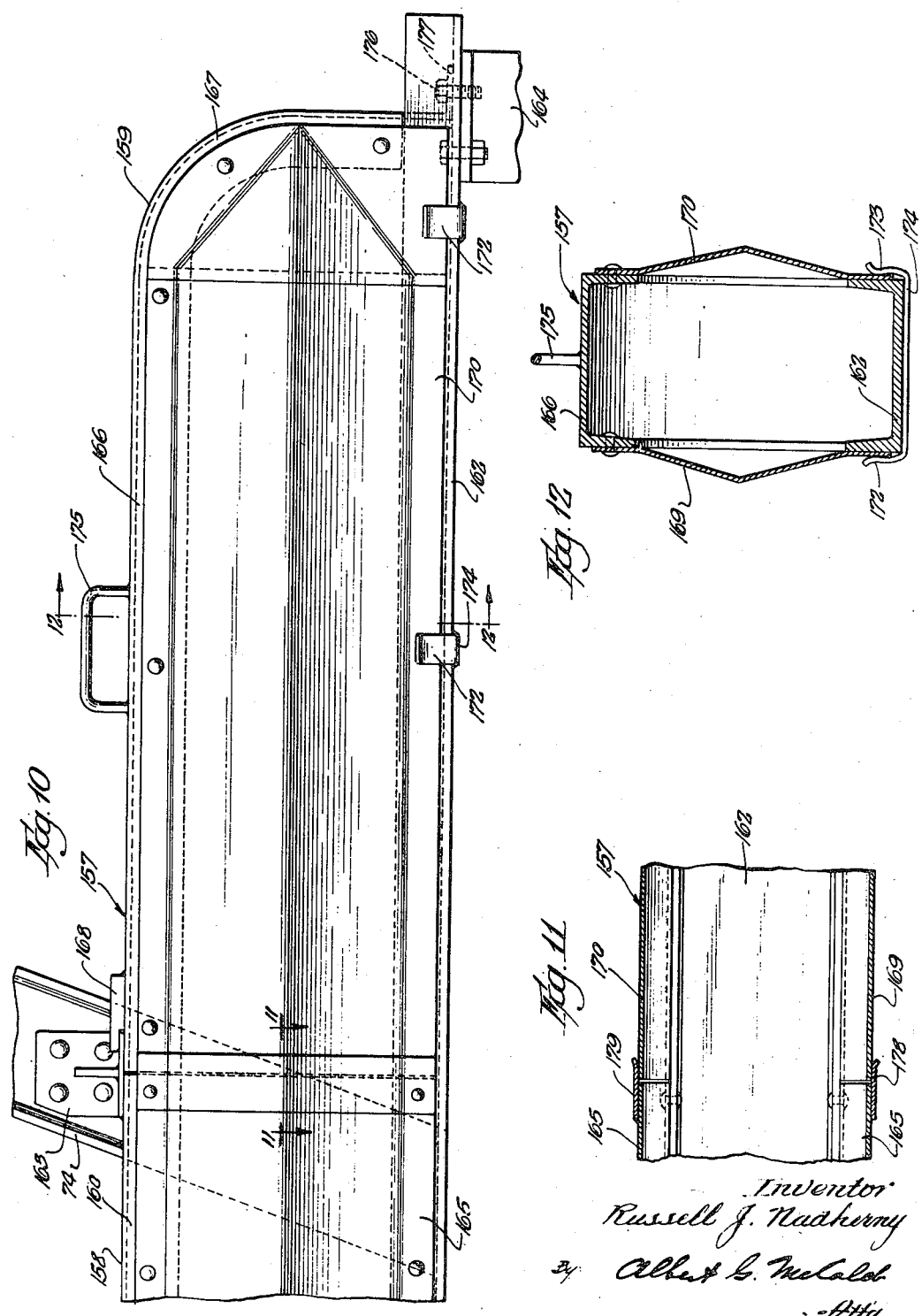

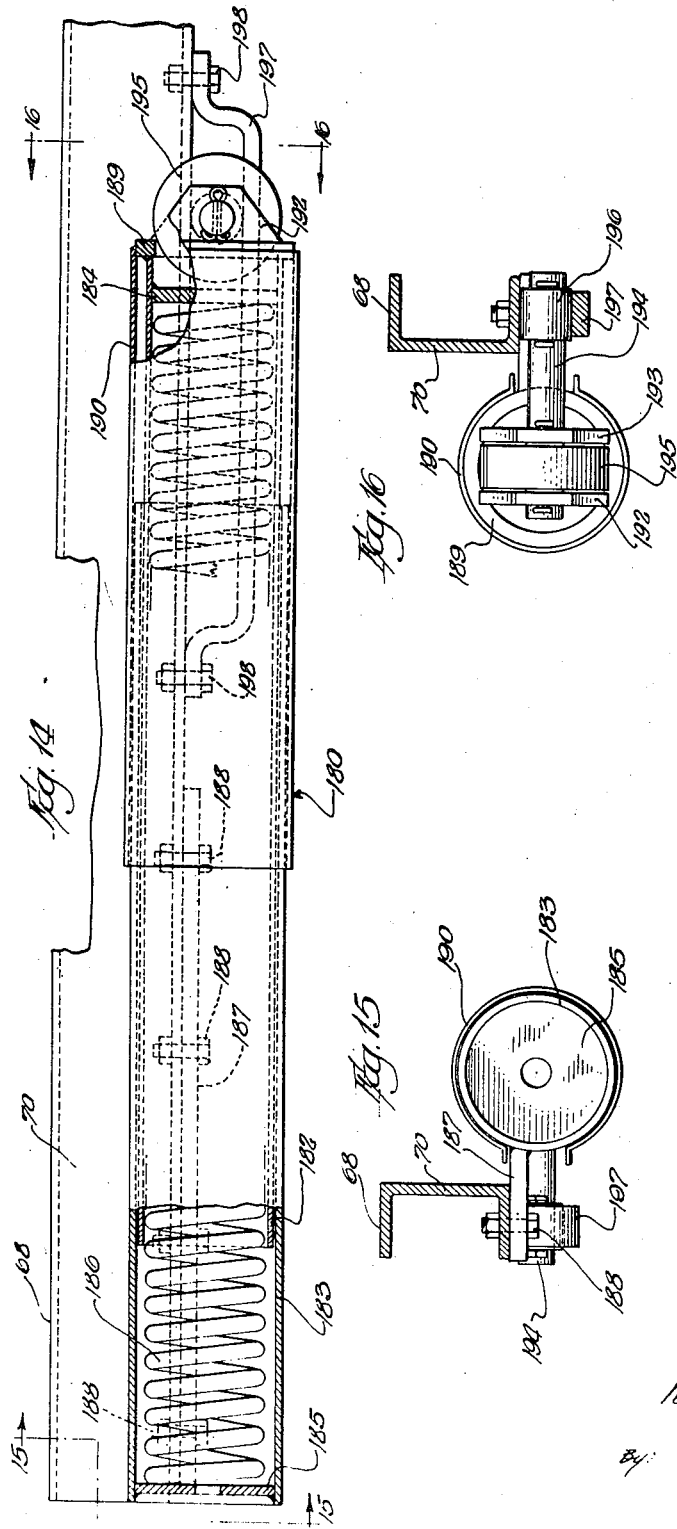

Patented Oct. 25, 1949

2,486,317

UNITED STATES PATENT OFFICE 2,486,317

MATERIAL HANDLING AND LOADING APPARATUS

Russell J. Nadherny, Chicago, Ill., assignor to Athey Products Corporation, Chicago, Ill., a corporation of Illinois Application June 10, 1946, Serial No. 675,634

4 Claims. (Cl. 214—131)

This invention relates to material handling and loading apparatus, and more particularly to such apparatus which is attached to a conventional tractor for operation therewith and thereby to perform functions, such as shoveling, transportation and/or loading of material.

One of the objects of my present invention is to provide material handling and loading apparatus for attachment to and use with a tractor, and in which apparatus provision is made for effective distribution of the load from the apparatus to the tractor parts in such a way and to such parts of the tractor structure that the possibility of over-stressing any of the tractor parts is minimized.

It is a further object of my invention to provide material handling and loading apparatus for attachment to a conventional tractor and including a hydraulic actuating system adapted to be driven by the tractor engine and controlled by the operator, the construction and arrangement of the parts of which apparatus are designed to promote ease of access to the working parts of the tractor as well as to interfere as little as possible with the ability of the operator to observe the work being done by the apparatus.

Another object of the invention is to provide material handling and loading apparatus for use on a tractor of the track-laying type which includes a spring between the track frame and the tractor chassis, which apparatus is adapted to transmit major portions of the weight and thrust loads directly to the track frame and includes substantially rigid means for relieving said spring of loads transmitted to the track frame through portions of the tractor chassis.

As another object my present invention comprehends the provision of material handling and loading apparatus in which an effective stop is disposed in the line of travel of a shovel-carrying boom against which the boom may strike to jar the load loose from the shovel and which includes resilience for the absorption of shock and for effecting commencement of the return movement of the boom and emptied shovel.

Other objects and advantages of the invention will be apparent from the following description and the accompanying drawings in which similar characters of reference indicate similar parts throughout the several views.

Referring to the ten sheets of drawings.

Figure 1:
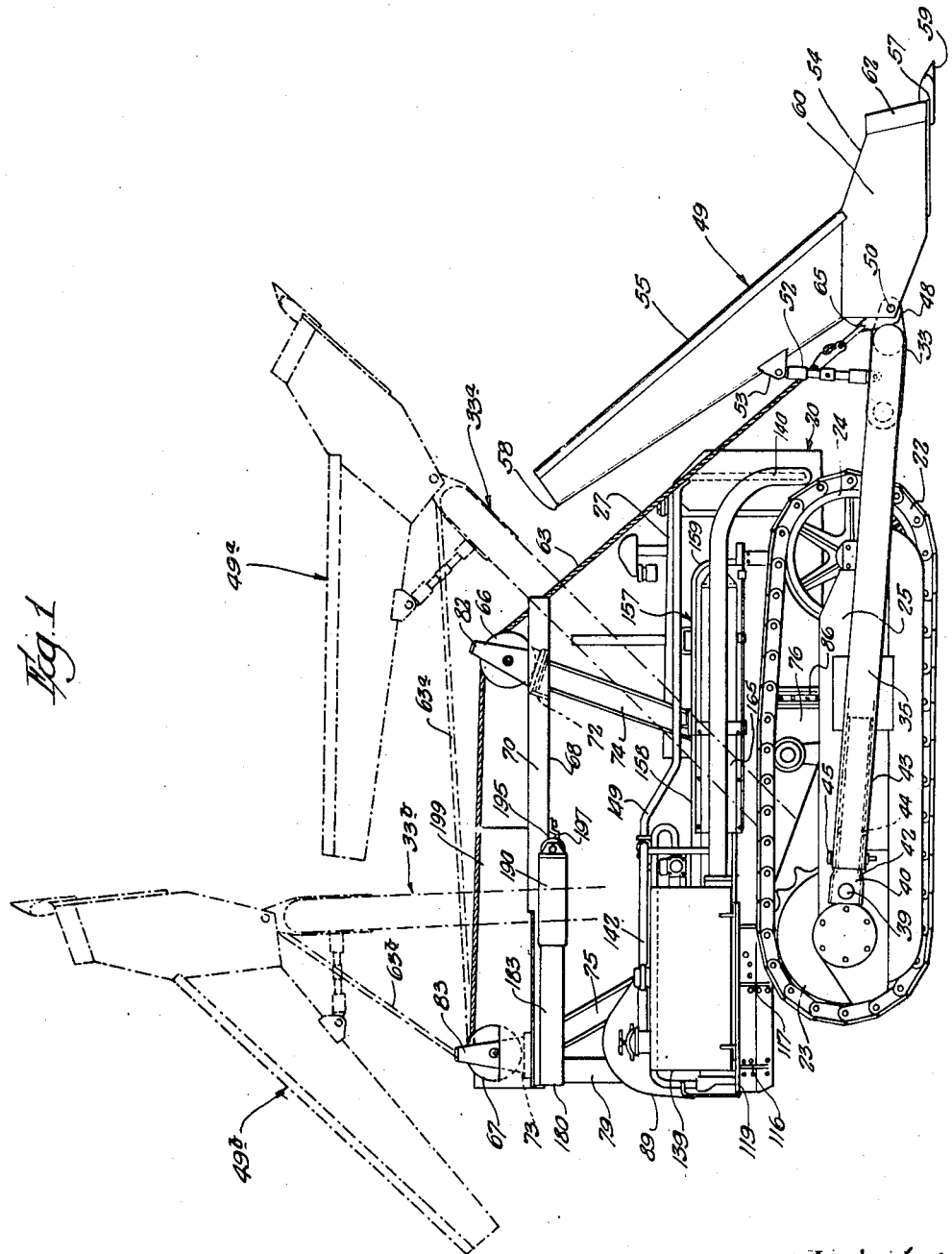
Fig. 1 is a side elevational view showing the adaptation of a preferred form of my material handling and loading apparatus in its adaptation to one type of tractor and depicting various positions of certain of the operating parts of the apparatus.
Figure 2:
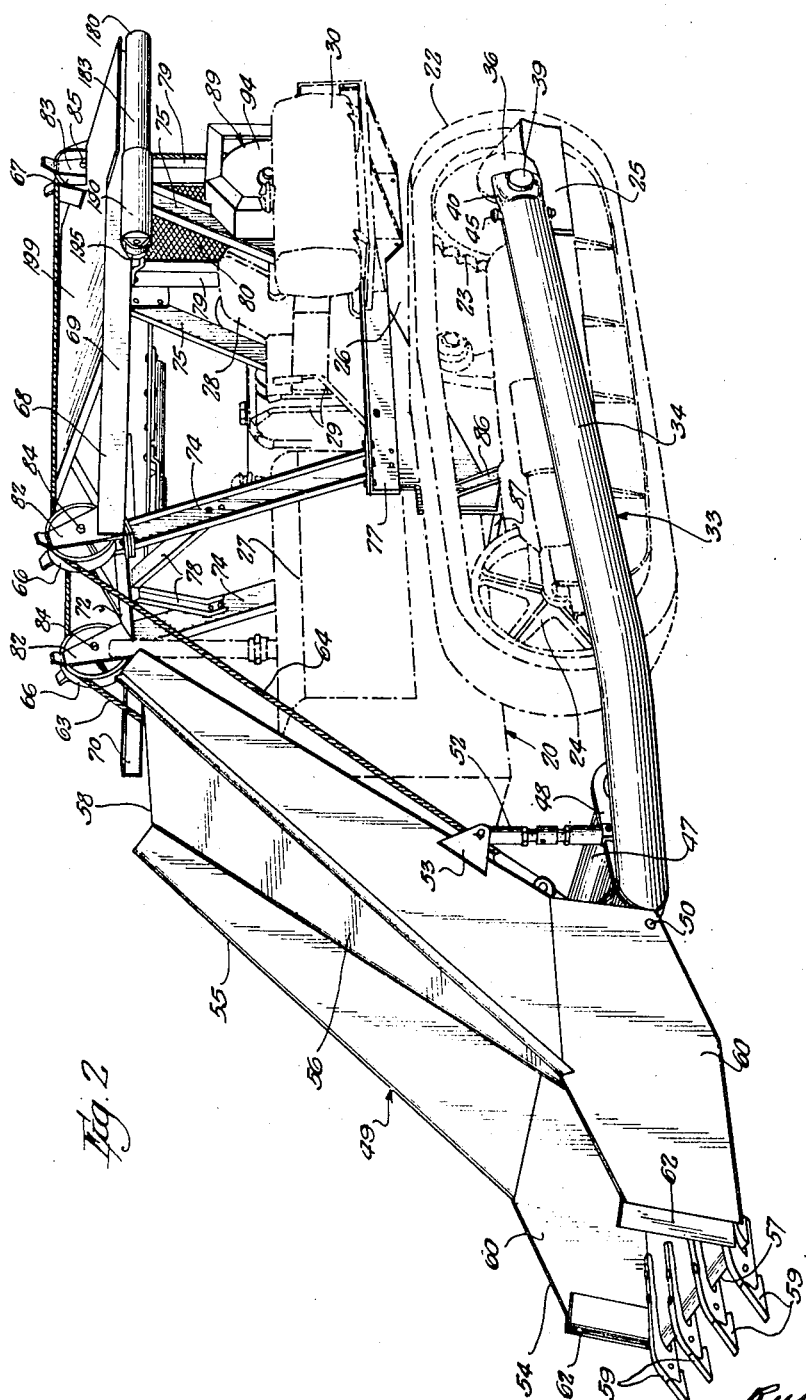
Fig. 2 is a perspective view taken from in front and to one side of the material handling and loading apparatus shown in Fig. 1, and in which view the parts of the tractor structure are depicted in dot and dash lines to distinguish them from the parts of my apparatus which are attached to the tractor.
Figure 3:
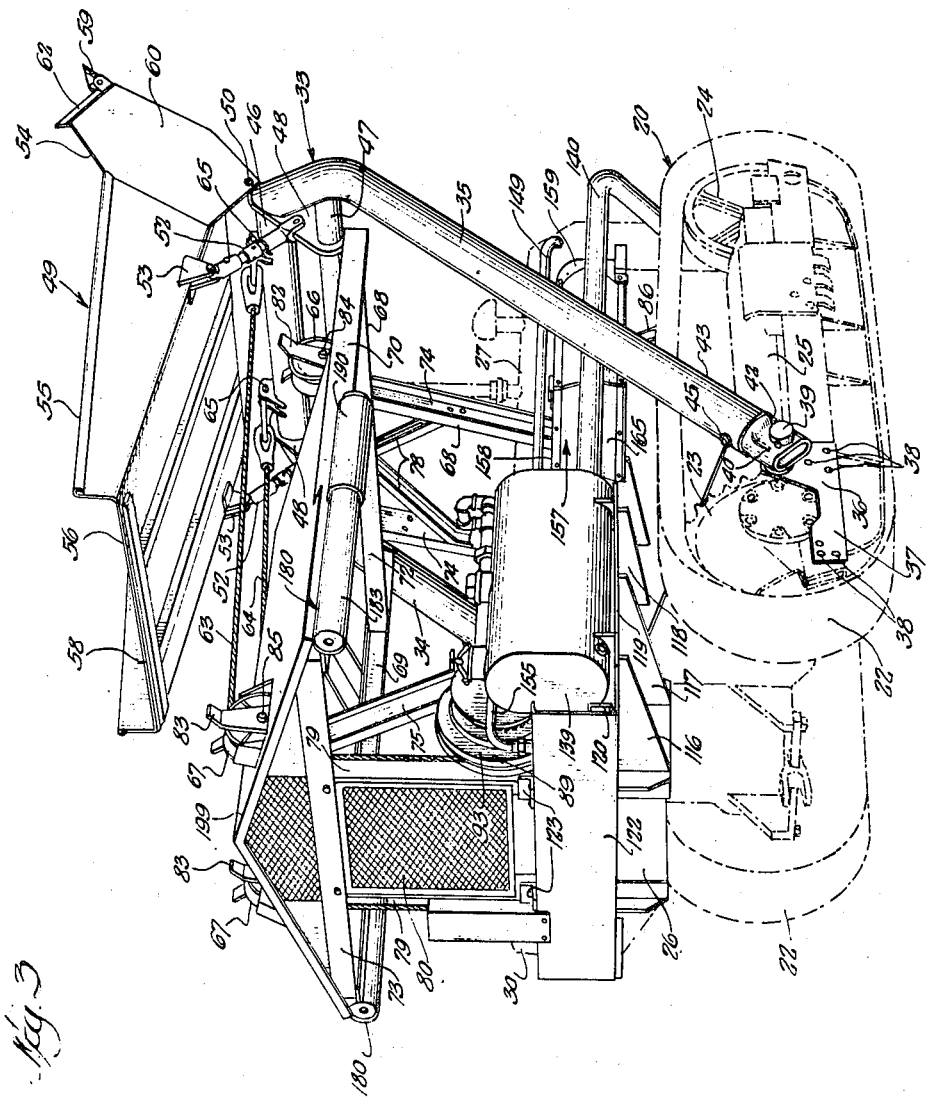
Fig. 3 is a perspective view taken from the rear and to one side of the material handling and loading apparatus shown in Figs. 1 and 2, and wherein the tractor structure is illustrated in dot and dash lines and the operating positions of the parts are different than those indicated in Fig. 2.
Figure 5:
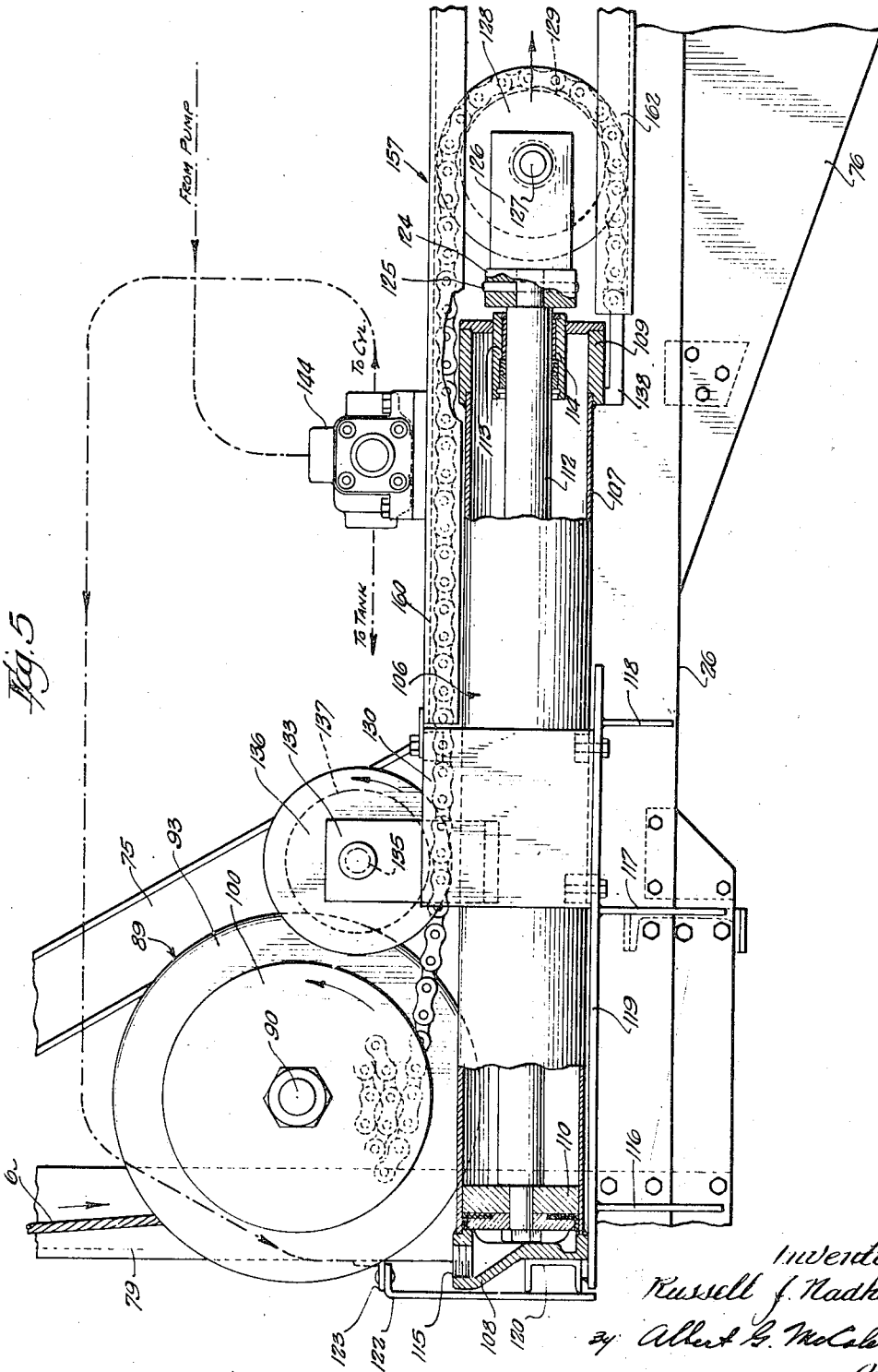
Fig. 5 is a fragmentary side elevational view of a portion of my preferred material handling and loading apparatus drawn to an enlarged scale and having portions cut away to illustrate certain structural details.
Figure 6:
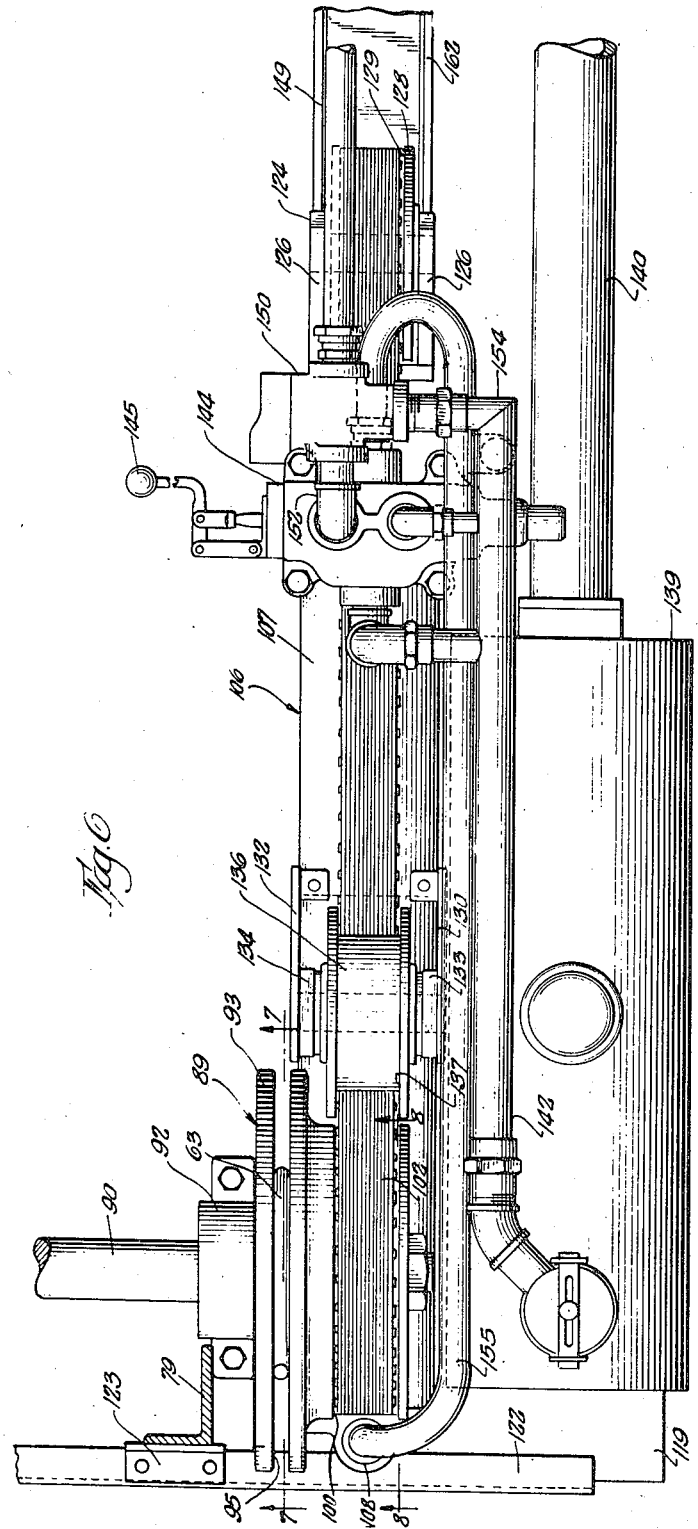
Fig. 6 is a fragmentary top view of the portion of the apparatus which is shown in Fig. 5.
Figure 7:
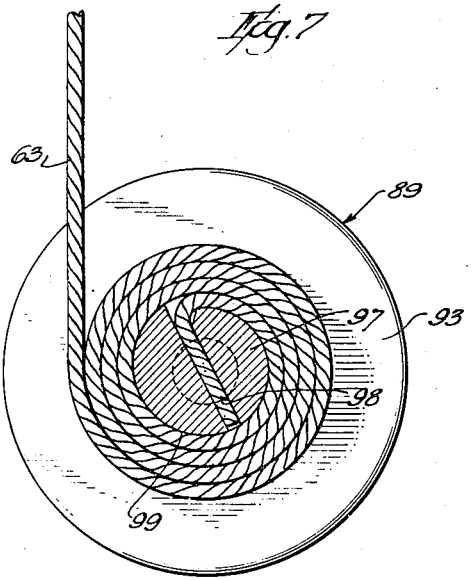
Figure 8:
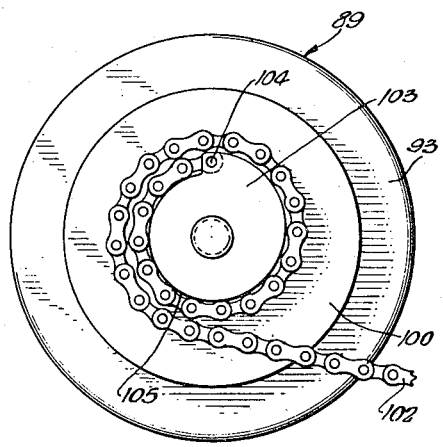
Figure 13:
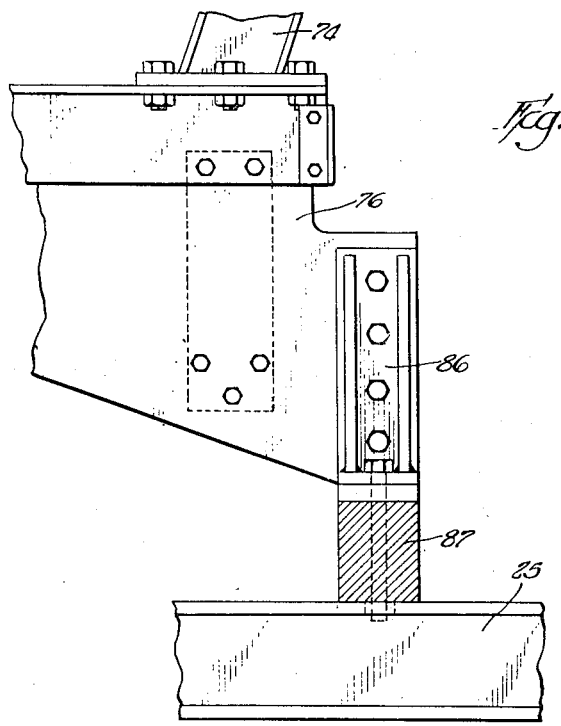

Figs. 7 and 8 are fragmentary sectional views of portions of the apparatus depicted in Figs. 5 and 6 and wherein the sections may be considered as taken substantially on lines 7—7 and 8—8 of Fig. 6 and viewed in the direction indicated by the arrows;

Fig. 9 is a schematic diagram illustrating a preferred type of hydraulic control system adapted to be utilized in the actuation and control of the disclosed apparatus;

Fig. 10 is a fragmentary side elevational view of a part of the disclosed apparatus drawn to an enlarged scale and illustrative of my preferred construction thereof;

Figs. 11 and 12 are fragmentary sectional views wherein the sections are taken substantially on lines 11—11 and 12—12 of Fig. 10 and viewed in the directions indicated by the arrows;

Fig. 13 is a fragmentary side sectional view drawn to an enlarged scale and illustrating the structural details of a portion of the disclosed apparatus;

Fig. 14 is a fragmentary side elevational view of a portion of the apparatus disclosed in Figs. 1, 2 and 3 drawn to an enlarged scale and having portions cut away to show structural details; and Figs. 15 and 16 are end sectional views of the portions of the apparatus shown in Fig. 14, and wherein the sections are taken substantially on lines 15—15 and 16—16 of Fig. 14 and viewed in the direction indicated by the arrows.

In the exemplary embodiment of my invention which is depicted in the accompanying drawings, Figs. 1 to 4, inclusive, are relatively general views showing the adaptation of a preferred form of my material handling and loading apparatus to a tractor of the track-laying type. Although such tractors are quite generally known in the art, it is pointed out for the sake of clarity and completeness of the description that the tractor 20 has flexible link type tracks 22 on its opposite sides, which tracks form closed loops and are movably carried by sprocket wheels 23 and 24 at longitudinally opposite ends of the loops. The sprockets 23 and 24 are rotatably carried at opposite ends of track frames 25.

A tractor chassis 26 is supported from and between the track frames. When the tractor is used for general purposes, the chassis is usually supported from the track frames through means (not shown) which includes a leaf spring. In the present instance, however, I have displaced the leaf spring, as will be more fully explained, by relatively rigid support means in order to transmit the carried loads more directly to the strong track frames and to minimize the possibility of damage to the less rugged tractor parts.

Figure 4:
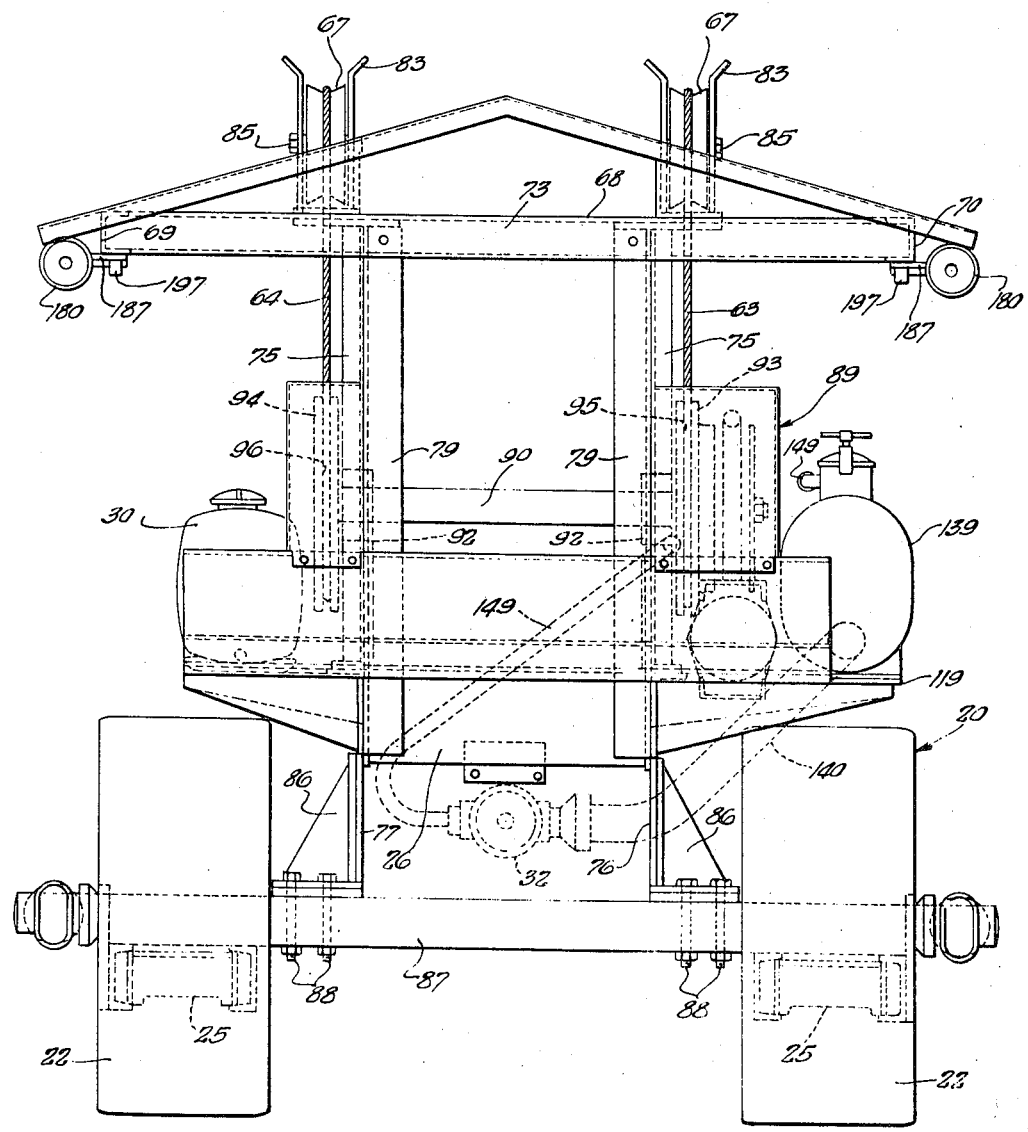
Fig. 4 is a rear elevational view of the apparatus applied to a tractor as shown in Figs. 1, 2 and 3.

At the front end of the chassis 26 is mounted an engine which is indicated generally by the outline at 27. At the opposite end above the chassis 26, an operator's seat 28 is mounted, from which an operator may control the operation of the tractor by means including levers 29. A fuel tank 30 is carried at one side of the tractor chassis and holds a supply of fuel for the engine. In installations such as that disclosed, wherein the material handling and loading apparatus is hydraulically actuated and controlled, the tractor is equipped with a fluid pressure pump 32 mounted in a suitable position, as shown in Fig. 4, and driven by the tractor engine.

It being one of the purposes of my present invention to provide material handling and loading apparatus which is not only rugged in itself but which is also attached to the tractor in a manner such that the ensemble is both rugged and durable, I have provided a substantially U-shaped shovel-carrying boom 33 of tubular material having substantially straight and parallel side arms 34 and 35 which straddle the track frames, and the ends of which are mounted on the track frames for vertical swinging movement by brackets 36. Each of the brackets 36 comprises a plate 37 secured to the track frame near the axis of the rear sprocket 23 by suitable fastening means, such as bolts 38. A stud 39 has one end secured to the plate and extends outwardly of the track frame through a bearing opening in a flattened end portion 40 at the end of each side arm. In order to provide for the longitudinal extension of the side arms 34 and 35, they each desirably include telescopically engaging tubular parts 42 and 43, one of which has therein a series of longitudinally displaced lateral through bores 44, as indicated in Fig. 1, so that the parts may be secured together at various positions of longitudinal extension by a pin 45.

At the forward end of the boom 33, a tubular intermediate portion 46, which connects the forward ends of the side arms 34 and 35, is substantially straight, as shown in Fig. 3. By preference, a tubular lateral brace 47 extends between and has its ends secured to the boom side arms 34 and 35 a short distance behind the intermediate portion 46. As depicted in Figs. 1, 2 and 3, hinge plates 48 are secured to and extend forwardly from the tubular brace 47 and the intermediate portion 46 at positions near the side arms 34 and 35 to provide supporting connections to a shovel 49. In the present instance the shovel is connected to the hinge plates by bearing pins 50.

In any instance, a shovel of the type disclosed, when used in association with the illustrated boom, may be mounted thereon for dumping at both the front and rear of the tractor, or, as in the present instance, it may be mounted for dumping at the rear only. When adapted to be dumped at the rear of the tractor, the angular relationship or position of the shovel relative to the end of the boom remains fixed during the operation, and provision is made for only relatively minor adjustments of the digging angle of the shovel. For this purpose I have provided links 52, each having one end secured to the mid-portion of one of the hinge plates 48 and its other end connected to brackets 53 which project rearwardly of the shovel at a position displaced from the pins 50 connecting the shovel to the hinge plates.

My preferred form of shovel 49, which is illustrated in Figs. 1, 2 and 3, has end portions 54 and 55 adjoining one another and disposed in obtuse angular relationship so that in the normal shoveling position shown in Fig. 2, the end portion 54 is adapted to receive the material scooped into the shovel, while the end portion 55 provides a back wall for the shovel. In an intermediate position, such as that depicted in Fig. 3 and as indicated in dot and dash lines at 49a in Fig. 1, both end portions of the shovel slope upwardly so that material is retained therein and may be moved from one place to another by movements of the tractor while the shovel is thus elevated. The dumping position of the shovel is illustrated in dot and dash lines at 49b in Fig. 1. In the latter position the end portion 55 provides a chute for guiding the dumped material and preventing it from falling on the tractor or parts of the apparatus.

In certain respects the structure of the shovel 49 is conducive to effective operation in association with the disclosed boom and its manner of attachment to the tractor. My preferred shovel comprises a bottom plate 56 which is substantially continuous and has angularly disposed end portions presenting a front cutting edge 57 and a rear dumping edge 58. Digging teeth 59 are desirably secured in laterally spaced relationship along the front edge of the shovel and project forwardly from the front cutting edge 57. Relatively rigid side plates 60 are desirably secured in parallel relationship to the bottom plate 56 on opposite sides of the front end portion 54 and have cutting plates 62 secured to their front edges. The rear ends of the side plates 60 extend rearwardly beyond the bottom plate 56 and serve as connecting brackets by which the shovel is secured to the hinge plates 48. Being flat and substantially parallel, the thrust applied to the shovel therethrough for digging purposes has little or no tendency to distort the shovel. Furthermore, the thrust for digging is transmitted longitudinally through the side arms of the boom from the track frame of the tractor. Being longitudinal of the boom side arms, the digging forces have practically no tendency to distort or twist the boom and, being applied to the boom from the track frames, only the most rugged portions of the tractor are stressed.

The boom 33 is raised by force applied through flexible cables 63 and 64, said cables being attached at their ends to brackets 65 secured to the intermediate portion 46 at laterally spaced positions on opposite sides thereof by applying the lifting force at the forward end of the boom and close to the shovel which carries the load to be lifted. The full mechanical advantage is achieved while the tendency to bend or distort the boom is minimized.

In order to provide an effective angle of approach for the cables 63 and 64, as well as an effective line of force application for lifting the boom and shovel, the cables extend upwardly and are guided by sheaves 66 and 67, which sheaves are rotatably supported by an overhead frame 68 which is mounted on the tractor. The overhead frame 68 includes longitudinally extending side channels 69 and 70 connected by laterally extending front and rear cross braces 72 and 73, respectively. The frame 68 is supported relative to the tractor by front and rear trusses 74 and 75, respectively, which trusses have their upper ends secured to the cross braces 72 and 73 near the side channels 69 and 70 and their lower ends secured to support plates 76 and 77 on opposite sides of the tractor chassis. The front trusses 74 are additionally secured to the cross brace 72 by angularly disposed braces 78. At the rear of the tractor vertically disposed angle bars 79 connect the rear cross brace 73 to the tractor chassis and provide a frame to which a rear protective screen 80 is secured.

Front and rear sheave support yokes 82 and 83 are secured to the front and rear cross braces 72 and 73, respectively, and carry shafts 84 and 85 upon which the sheaves 66 and 67, respectively, are rotatably supported.

The side plates 76 and 77 are secured to the tractor chassis. However, since it is desirable to relieve the tractor chassis as much as possible of the application of heavy loads which might in some instances tend to distort the chassis, the side plates extend downwardly toward a position near the front of the tractor at which the leaf spring means is generally used to support the front portion of the tractor chassis from the track frames. The side plates are desirably made of heavy stock, and each one has secured to its outer surface and projecting outwardly therefrom a stabilizer bracket 86. In my preferred adaptation of the loading apparatus to a tractor of the type disclosed, the usual spring means for supporting the tractor chassis from the track frames is replaced by a stabilizer bar 87 which, as illustrated in Figs. 4 and 13, extends across and is supported by the track frames 25, and also has secured thereto between the track frames by fastening means, such as bolts 88, the stabilizer brackets 86. Thus the load lifting forces which are transmitted downwardly from the cables 63 and 64 through the sheaves, trusses and side plates, are carried through the substantially rigid structure of the stabilizer bar 87 on the track frames 25. This relieves the tractor chassis of considerable stress.

In order further to facilitate the relatively direct transmission of the lifting forces from the cables 63 and 64 to the track frames, the trusses 74 and 75, through which the sheaves are supported, are secured to the side plates 76 and 77 and are disposed at such angles relative thereto that the forces carried through those trusses are directed toward the stabilizer bar. The trusses thus slope outwardly from the side plates to the overhead frame.

It is natural that some of the heaviest lifting stresses occur in breaking loose a quantity of material, such as dirt, after the shovel has been forced into it in scooping up a load. For this reason the front trusses 74 are almost directly over the stabilizer bar and are angularly disposed to direct the forces therethrough to the track frame. As depicted in Figs. 1, 2 and 3, the cables 63 and 64 remain in engagement with the front sheaves 66 during the initial upward swinging movement of the boom, and then rise off of those front sheaves and remain in contact with only the rear sheaves 67. Hence, when the boom is in the carrying position shown in Fig. 2 and in dot and dash lines at 33a in Fig. 1, the cables rise substantially to the level indicated in Fig. 3 and in dot and dash lines at 63a in Fig. 1, and the lifting forces from the cables are transferred entirely to the rear sheaves 67 and the rear trusses 75. Although the shovel may be carried in this position for the transfer of material from one place to another, it may also be swung to a dumping position by movement of the boom to the position indicated in dot and dash lines at 33b in Fig. 1, in which instance the cables move substantially to the position indicated at 63b. In this position it may be noted that the boom is practically vertical and that the chute portion of the shovel slopes downwardly for the dumping of the material.

For applying the forces to the cables 63 and 64 to lift the boom and shovel and to move them to and through the positions of elevation which have been described, I utilize a winch 89 which is secured to the rear end of the tractor chassis behind the operator's seat 28, which winch, in the present instance, is driven by a hydraulically actuated operating mechanism shown in Figs. 5 and 6.

Referring to the structure of the winch disclosed in Figs. 1 to 8, inclusive, it includes a shaft 90 extending transversely across the rear of the tractor and rotatably supported from the chassis by suitable bearing brackets 92 near opposite ends thereof. Outside of the bearing brackets and in alignment with the cables 63 and 64, the shaft has mounted thereon, and drivingly connected thereto, winding drums 93 and 94, respectively. The winding drums 93 and 94 have annular slots 95 and 96 therein, the axial lengths of which are substantially equal to or only slightly greater than the diameters of the cables 63 and 64, so that when the cables are wound in their respective drums, the turns fall one on top of the other in successive convolutions, as shown in Fig. 7. Since the cables are to be wound spirally in the slots and it is desirable to avoid bumps in the convolutions which would effect uneven movement, each of the drums is provided with a core 97, as shown in Fig. 7, in which the end of the cable is anchored in a transverse bore 98 and which has a spirally formed outer surface 99 so related to the position of the anchored end of the cable that the turns follow smoothly over the core and one another.

The effect of the spirally wound turns is that when the shovel is in its lowered or digging position, the cables are paid out so that upon the application of driving force to the winch, the small winding drum diameter provides maximum leverage and slow initial movement for breaking the shovel loose and starting the upward movement of the load. As the upward travel progresses, the successive convolutions of the cables effectively increase the diameter of the winding drum to gradually increase the rate of upward movement. This is desirable since the stronger forces are no longer necessary after the shovel has started its upward movement and the speed of operation may be increased without detriment.

For applying driving force to the winch, I have at one end thereof and coaxially disposed with respect to the drums 93 and 94 on the shaft 90, a driving drum 100. Upon this drum a flexible tension-applying element, such as a chain 102, is spirally wound in a direction opposite to that in which the cables 63 and 64 are wound upon their respective drums. Also it may be noted that the chain is wound on its drum when the cables are paid out and is unwound as the cables are wound. Like the cores provided for the drums 93 and 94, the driving drum 100 has a core 103, to which one end of the chain 102 is anchored by a pin 104 and which has a spirally formed outer surface 105 such that the successive convolutions of the chain wind smoothly over the core and one another.

The leverage effect of the spirally wound chain 102 through which the driving force is applied to the winch is complementary to the leverage and speed effects attained by the spiral winding of the cables. That is, when the shovel is in its lowered or digging position, the chain 102 is fully wound upon the drum 100 so that a maximum starting leverage is applied to the winch by force transmitted through the chain. Also, with uniform linear movement of the chain for actuating the winch, the speed of rotation of the winch is increased gradually as the chain is unwound.

For applying the winch-actuating force to the chain 102, I utilize a hydraulic ram 106, as shown in Figs. 5 and 6. The hydraulic ram 106 includes a cylinder 107, to the ends of which are secured end caps 108 and 109 and through which a piston 110 is longitudinally slidable. A piston rod 112 has one end secured to the piston in a position coaxial with the cylinder 107 while its other end extends through and is slidably mounted in a centrally disposed bearing 113 carried by an axially disposed flange 114 on the end cap 109. The end cap 108 is provided with a threaded fluid inlet opening 115 through which fluid under pressure is introduced into the cylinder to effect movement of the piston in one direction.

To effect simplicity in the alignment of the parts of the winch-actuating mechanism, which includes the driving drum 100, the flexible driving chain 102, and the hydraulic ram 106, the ram is mounted below the driving drum 100 with its axis transverse to the axis of the drum and substantially aligned with the drum. In this position the cylinder 107 is supported relative to the tractor chassis 25 by a bracket including outwardly projecting plates 116, 117 and 118 secured to the chassis and having secured thereto a base plate 119. At its rear end the cylinder is further retained by a channel 120 mounted between the end cap 108 and a rear cover plate 122, which cover plate is secured by brackets 123 to the vertically disposed angle bars 79. As shown by Figs. 1 and 2, the cylinder is disposed closely adjacent the side of the chassis and to the rear of the tractor engine 27 so that the piston rod 112 is movable forwardly along one side of the engine.

A forwardly extending yoke 124 is mounted on the forward end of the piston rod 112 and is secured thereto by fastening means, such as a pin 125 (Fig. 5). Parallel side portions 126 of the yoke carry opposite ends of a shaft 127, upon which a sheave 128 is rotatably mounted between those side portions. A channel 129 in the periphery of the sheave 128 is of a width and depth adapted to receive and guide the chain 102.

Parallel and opposed brackets 130 and 132 have side extension plates 133 and 134 secured thereto and are secured to the base plate 119 on opposite sides of the chain 102. A shaft 135 extending between and carried by the side plates 133 and 134, rotatably supports an idler or guide pulley 136 between and in alignment with the drum 100 and sheave 128. The guide pulley 136 has a peripheral channel 137 of a depth and width adapted to receive and guide the chain 102.

The chain 102, which is normally wound upon the drum 100 when the piston rod is in the retracted position shown in Fig. 5, extends through one side of the channel 137 of the pulley 136 and thence around a portion of the channel of the sheave 128; the end of the chain being anchored to an anchor bracket 138 secured to the end cap 109 on the cylinder. Outward linear movement of the piston rod 112 thus imparts a driving force to the chain 102 and unwinds that chain from the drum 100 to effect rotary movement of the winch for winding the cables 63 and 64 upon their respective drums.

One manner of effecting the control and operation of the hydraulic ram which is suited to the present adaptation of my material handling and loading apparatus is illustrated diagrammatically in Fig. 9. In the disclosed system a supply tank 139 carries a supply of an actuating liquid, such as oil, and has outlet and return pipes 140 and 142, respectively, connected thereto. Desirably, the outlet pipe 140 is equipped with strainers 143. Liquid is continuously pumped from the tank 139 through the outlet pipe 140 by the engine driven pump 32 when the tractor engine is in operation.

A control valve 144, having a manually operable handle 145, is utilized to control the flow of the hydraulic actuating liquid through the system and thereby to effect the desired control of the operation of the material handling and loading apparatus. In the neutral position of the control valve 144, in which the handle 145 is in the position shown in solid lines, valve ports 146 and 147 are both connected for communication with an outlet port 148. In this position the liquid from the pump 32 is forced through a pipe 149, a relief valve 150, and a pipe 152 to the control valve, and thence back through the pipe 142 to the tank 139. Liquid pressure is relieved on the piston rod side of the piston 110 although it is retained on the opposite side of the piston by the closing of a valve port 153. This retains the material handling and loading apparatus in the position to which it has been actuated prior to the movement of the valve to the neutral position.

In the event of an abnormal condition such that the pressures in the system become excessive, the relief valve 150 automatically opens to permit the return of liquid under pressure from the pump to the supply tank through a pipe 154. Such return flow through the relief valve may occur during any stage of the operation.

For raising the boom and shovel, the control handle 145 is moved to the position indicated in dotted lines at 145a. This movement of the control handle effects a communicating connection between the ports 146 and 153 so that liquid under pressure from the pump 32 is forced through a pipe 155 to the side of the piston 110 opposite the piston rod 112 so that the piston rod is driven from a retracted to an extended position. In this position of the control valve communication is also provided between the ports 147 and 148 so that the piston rod side of the piston is connected through a pipe 156 to the return pipe 142.

When the boom and shovel are to be lowered from a raised position, the control handle is moved to the position indicated in dot and dash lines at 145b, in which position communication is provided between the ports 153 and 147 and between the ports 146 and 148. This shift of the connections introduces liquid under pressure to the piston rod side of the piston and relieves the pressure on the opposite side of the piston by connecting it to the return pipe. The fluid pressure thus drives the piston to effect retraction of the piston rod.

As shown in Figs. 1, 3 and 5, the chain 102, sheave 128, and piston rod 112 are enclosed and protected by a housing 157 which extends forwardly from the brackets 130 and 132 along the side of the tractor engine to a position such that it provides ample room for the piston rod to move to its fully extended position. By preference, the housing 157 has a rear portion 158 which is fixed in position and a forward portion 159 beside the tractor engine which is readily movable to provide clear access to the engine when the piston rod is retracted.

The fixed portion 158 of the housing includes substantially parallel upper and lower channels 160 and 162 disposed in spaced relationship above and below the portions of the chain on opposite sides of the sheave 128. The upper channel 160 has one end secured to the brackets 130 and 132, as shown in Fig. 5, and its other end secured to a bracket 163 on the front truss 74 so that it terminates adjacent the rear end of the tractor engine. The lower channel 162 is secured to the tractor chassis adjacent the forward end of the cylinder 107 and extends forwardly to the front of the housing and has its forward end secured to a bracket 164 on the side of the chassis. Side plates, such as 165, are secured to the channels 160 and 162 to provide side covers extending forwardly to the forward end of the channel 160.

As shown in Figs. 10, 11 and 12, the removable forward portion 159 of the housing includes an upper channel 166 having a straight top portion and a downwardly curved end portion 167. Near its rear end the channel 166 has secured thereto a clip bracket 168 which engages the bracket 163 to hold the channel 166 in substantial alignment with the channel 158 with their ends in abutting relationship. Side plates 169 and 170 are secured to and extend downwardly from opposite sides of the channel 166 to provide side walls for the removable portion of the housing. When put in place, the lower edges of the side walls 169 and 170 are gripped and clamped against the outer sides of the lower channel 162 by upwardly extending fingers 172 and 173 at the opposite ends of retaining clamps 174. A handle 175 is secured to the top of the upper channel 166 to facilitate the lifting of the removable portion 159 or its replacement to the covering position. For holding the removable cover more firmly in place during the vibrations encountered in operation, I prefer to provide a forward fastening means, such as a cap screw 176, which extends through an outwardly projecting forward end 177 on the channel 166 and is threaded into the lower channel 162. When the cap screw 176 is removed, the removable portion 159 of the housing is readily moved from and to its operating position. Side cover plates 178 and 179 are desirably secured to and extend forwardly from the side plates 165 to aid in holding the removable cover portion in place and to cover the joint between the two housing portions.

For arresting the movement of the boom and shovel at the upper extremity of their swinging movement, I have provided resilient bumpers 180 which are secured to opposite sides of the overhead frames 68, as shown in Figs. 1 to 4, inclusive. The details of the internal structure and mounting supports for these bumpers are shown in Figs. 14, 15 and 16. Being resilient, the bumpers not only absorb the thrust of the boom at the upper limit of its movement, but also provide abutments against which the boom strikes at the upper end of its movement to provide sufficient jar or shock to shake material loose which is lodged in the bucket at the dumping end of its stroke. The bumpers also accelerate the downward movement of the boom and shovel when the hydraulic system is set to produce such movement.

Having particular reference to Figs. 14, 15 and 16, the bumpers comprise telescopically engaging inner and outer tubes 182 and 183, respectively, which have end plates 184 and 185 secured in opposite ends thereof. A compression spring 186 is mounted within the tubes 182 and 183 and disposed between the end plates 184 and 185 for biasing the bumper to an extended position.

On one side the tube 183 has an outwardly extending mounting plate 187 secured thereto, as by welding, which mounting plate is secured to the side channel 70 of the overhead frame by fastening means, such as bolts 188. At the opposite end the tube 182 is extended beyond the end plate 184 and carries an end ring 189. The end ring 189 has a cover 190 secured to its periphery, which cover overlaps and encloses a portion of the outer tube 183. The inner portion of the cover adjacent the overhead frame is open longitudinally to provide clearance for the mounting plate 187 as the cover moves along the surface of the outer tube during the compression of the spring 186.

On its outer end the ring 189 has spaced and parallel plates 192 and 193 secured thereto in spaced relationship and projecting endwise away from the tubes. A shaft 194 is rotatably supported by the plates 192 and 193 and carries a roller 195 between the end plates, which roller serves as a contact element for engaging a side arm of the boom. To provide additional support for the bumper, the shaft 194 also extends inwardly toward the overhead frame and carries an inner roller 196 which is confined between the lower outer surface of the side channel 70 and a track strip 197. The mid-portion of the track strip 197 is substantially straight and parallel to the lower surface of the side channel 70 and is desirably somewhat longer than the extreme limits of movement of the movable portion of the bumper. The ends of the track strip 197 are shaped to provide brackets which are secured to the side channel 70 by fastening means, such as bolts 198.

During the upward movement of the boom, the side arms thereof engage the rollers 195 to effect endwise movement of the tube 182 relative to the tube 183 against the biasing force of the compression spring 186. As the movement of the bumper progresses, the roller 196 aids in maintaining proper alignment of the tubes. If one movement of the boom against the bumpers is insufficient to jar a load of sticky material from the bucket, several such jolts may be quickly effected by reversal of the bucket movement aided by the biasing force of the spring 186. During the use of the apparatus, the cover 190 prevents dirt from getting into the working parts of the bumper.

Since the shovel is carried in an elevated position for transporting material and is dumped at the rear of the tractor with the bucket overhead, I prefer to provide a cover plate 199 which is secured to the overhead frame to prevent material from the shovel from falling onto the tractor and the operator.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In material handling and loading apparatus for attachment to a tractor of the tracklaying type which includes track frames, a chassis supported by the track frames through spring means, an engine carried by the chassis and a fluid pressure pump driven by the engine, the combination comprising a boom having side arms spaced to straddle the track frames of the tractor, a shovel secured to the boom at one end of the arms, said shovel having side wall and end portions disposed in obtuse angular relationship and being open at both ends, means for securing the other ends of said arms to said track frames for vertical swinging movement to carry said shovel between a shoveling position in front of the tractor, a carrying position above the tractor and a dumping position at the rear of the tractor, said boom being practically horizontal when the shovel is in the shoveling position and practically vertical when the shovel is in the dumping position, an overhead frame adapted to be secured to the tractor and supported by trusses diverging upwardly to opposite ends of the frame and having lower ends connected to the tractor chassis through substantially rigid side plates, sheaves rotatably carried by said overhead frame, a winch adapted for mounting at the rear of the tractor, cable means adapted to coact with said sheaves and connecting the boom to said winch, hydraulic means adapted to actuation by fluid pressure from said pump and having an element movable along one side of the tractor for driving said winch to raise the boom and shovel, substantially rigid means supplementing said spring means for transmitting forces from said chassis and side plates to the track frames, and resiliently supported stop means carried by said overhead frame in the path of upward swinging movement of the boom for arresting the upward movement at the dumping position and reversing the direction of movement of the boom for return of the shovel by gravity.

2. In material handling and loading apparatus for attachment to a tractor which includes a chassis, an engine carried at the front end of the chassis, an operator's seat at the other end of the chassis, and a fluid pressure pump driven by the engine, the combination comprising a shovel, means for supporting the shovel for vertical swinging movement at the front of the tractor, a winch for mounting at the rear of the tractor, frame means for mounting on the tractor chassis to extend upwardly therefrom between the winch and the shovel, sheaves rotatably carried by said frame means, flexible cable means adapted to extend across the upper surfaces of the sheaves for connecting the shovel-supporting means to the winch, a hydraulic ram including a cylinder and a linearly movable piston rod having an end extending from the cylinder, said ram being adapted for connection to said fluid pressure pump through control valve means, and said piston having pulley means rotatably carried by the extending end thereof, said winch having drum means at one end thereof, said hydraulic cylinder being adapted to fixed mounting on one side of the tractor at the rear end thereof with said end of the piston rod extending forwardly of the tractor and said pulley means aligned with said drum means of the winch so that said pulley means is movable with the piston rod from and toward the drum means, and flexible tension means encircling a portion of said pulley means and having one end anchored adjacent the cylinder and the other end normally wound upon said drum means so that forward movement of the piston rod effects rotation of the winch to wind said flexible cable means thereon.

3. As an attachment for a tractor having a chassis, an engine at one end of the chassis, an operator's seat at the other end of the chassis, and a fluid pressure pump driven by the engine, material handling and loading apparatus comprising a shovel, means for supporting the shovel for vertical swinging movement at the front of the tractor, a winch mounted at the rear of the tractor behind the operator's seat and including a plurality of winding drum portions, one of said winding drum portions being at one side of the tractor, cable guide means above the tractor, cable means connecting the shovel to the other of said winding drum portions raising and lowering the shovel upon rotation of the winch, a hydraulic ram including a cylinder mounted on the rear of the chassis adjacent said one of the drum portions and a linearly movable piston rod having an end extending forwardly of the tractor from the cylinder, said piston rod having pulley means rotatably mounted on the extending end thereof in alignment longitudinally of the tractor chassis with said one of the winding drum portions, flexible means overlying a portion of said pulley means and having one end anchored adjacent the forward end of the cylinder and its other end normally wound on said one of the drum portions so that forward movement of the piston rod effects rotation of the winch to raise the shovel, said piston rod having an extended position at the side of the tractor engine and a retracted position behind the engine, a housing having a portion adjacent the engine and within which said piston rod moves, and means supporting said housing for ready removal so that when the housing is removed and the piston rod retracted the engine is exposed for access thereto.

4. As an attachment for a tractor having a chassis and an engine mounted at one end of the chassis, which tractor has at its front end a shovel supported for vertical swinging movement, the combination comprising shovel-moving means for determining the vertical position of the shovel, said shovel-moving means including a hydraulic ram having a cylinder and linearly movable piston rod, said piston rod projecting from one end of the cylinder and having extended and retracted positions relative thereto, means for supporting the cylinder at the rear of one side of the chassis with the piston rod projecting forwardly so that in said extended position the piston rod projects along one side of the engine, the position of said cylinder longitudinally of the tractor being such that in said retracted position the projecting end of the piston rod is behind the engine, a cover within which said piston rod moves to and from said positions, means for removably holding said cover in place at one side of the engine so that when the cover is removed and the piston rod retracted interference with access to the engine is avoided.

RUSSELL J. NADHERNY.

REFERENCES CITED

The following references are of record in the file of this patent:

UNITED STATES PATENTS

| Number | Name | Date |
| --- | --- | --- |
| 2,109,440 | Villerup | Feb. 22, 1938 |
| 2,239,288 | Garner | Apr. 22, 1941 |
| 2,307,717 | Woodbury | Jan. 5, 1943 |
| 2,316,760 | Andersen et al. | Apr. 20, 1943 |
| 2,323,404 | Kuchar | July 6, 1943 |
| 2,323,434 | Williams | July 6, 1943 |
| 2,377,495 | Hofmeister | June 5, 1945 |
| 2,398,859 | Ruddock | Apr. 23, 1946 |
| 2,427,968 | Hoover | Sept. 23, 1947 |
| 2,438,660 | Garner | Mar. 30, 1948 |